(12) United States Patent
Nanavati et al.

(10) Patent No.: US 8,990,093 B2
(45) Date of Patent: *Mar. 24, 2015

(54) VISUALIZING, NAVIGATING AND INTERACTING WITH AUDIO CONTENT

(75) Inventors: Amit Anil Nanavati, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/598,403

(22) Filed: Aug. 29, 2012

(65) Prior Publication Data

US 2013/0054250 A1    Feb. 28, 2013

Related U.S. Application Data

(63) Continuation of application No. 13/216,807, filed on Aug. 24, 2011.

(51) Int. Cl.
*G10L 21/06* (2013.01)
*H04M 3/493* (2006.01)

(52) U.S. Cl.
CPC .............. *H04M 3/493* (2013.01); *G10L 21/06* (2013.01); *H04M 3/4938* (2013.01); *H04M 2203/25* (2013.01)
USPC ........................................................ 704/276

(58) Field of Classification Search
USPC ................. 704/270.1, 276, 278, 235, 270
See application file for complete search history.

(56) References Cited

U.S. PATENT DOCUMENTS

| | | |
|---|---|---|
| 5,915,001 A | 6/1999 | Uppaluru |
| 6,400,996 B1 | 6/2002 | Hoffberg et al. |
| 7,526,505 B2 | 4/2009 | Dideriksen et al. |
| 8,068,105 B1 * | 11/2011 | Classen ........................ 345/440 |
| 2003/0117428 A1 | 6/2003 | Li et al. |
| 2004/0141622 A1 | 7/2004 | Squibbs |
| 2009/0281810 A1 | 11/2009 | Sziklai et al. |

FOREIGN PATENT DOCUMENTS

| | | |
|---|---|---|
| EP | 2096626 | 2/2008 |
| WO | 2007089129 | 8/2007 |

(Continued)

OTHER PUBLICATIONS

Kumar, Arun, et al., "The spoken web application framework: user generated content and service creation through low-end mobiles", W4A2010—Technical, co-located with the 19th International World Wide Web Conference, Apr. 26-27, 2010, 10 pages, Raleigh, North Carolina, USA.

(Continued)

*Primary Examiner* — Abul Azad
(74) *Attorney, Agent, or Firm* — Ference & Associates LLC (57) ABSTRACT

Methods and arrangements for visually representing audio content in a voice application. A display is connected to a voice application, and an image is displayed on the display, the image comprising a main portion and at least one subsidiary portion, the main portion representing a contextual entity of the audio content and the at least one subsidiary portion representing at least one participatory entity of the audio content. The at least one subsidiary portion is displayed without text, and the image is changed responsive to changes in audio content in the voice application.

9 Claims, 10 Drawing Sheets

(56) References Cited

FOREIGN PATENT DOCUMENTS

WO 2008001143 1/2008
WO 2009032795 3/2009

OTHER PUBLICATIONS

C. G. v. d. Boogaart, et al., "Audio Brush: Smart Audio Editing in the Spectrogram", Report 2006-12, Institut Fur Informatik, Universitat Augsburg, Apr. 2006, 12 pages, Augsburg, Germany.

Goto, Masataka, "Augmented Music-Understanding Interfaces", 6th Sound & Music Computing Conference, SMC 2009 Inspirational session, Jul. 23-25, 2009, 1 page, Porto, Portugal.

Tzanetakis, George, et al., "Audio Information Retrieval (AIR) Tools", 12 pages, Department of Computer Science and Department of Music, Princeton University, available at http://www.ee.columbia.edu/~dpwe/papers/TzanC00-airtools.pdf as of Aug. 24, 2011.

Yoshii, Kazuyoshi, et al., "Music Thumbnailer: Visualizing Musical Pieces in Thumbnail Images Based on Acoustic Features", 9th International Conference on Music Information Retrieval, ISMIR 2008, Sep. 14-18, 2008, pp. 211-216, Philadelphia, Pennsylvania, USA.

* cited by examiner

VISUALIZING, NAVIGATING AND INTERACTING WITH AUDIO CONTENT

CROSS REFERENCE TO RELATED APPLICATION

This application is a continuation of U.S. patent application Ser. No. 13/216,807, entitled VISUALIZING, NAVIGATING AND INTERACTING WITH AUDIO CONTENT, filed on Aug. 24, 2011, which is incorporated by reference in its entirety.

BACKGROUND

The lack of internet access in many parts of the world, especially in developing countries, has given rise to voice applications with a capability for user-generated content. These permit a user to phone into a number and access voice application sites analogous to websites, yet controlled, delivered and administered via audio and voice. Voice application platforms and associated sites thus represent tremendous potential for utility but, unfortunately, significant challenges can arise in connection with relying solely on auditory cues in appreciating and understanding the content, as auditory cues alone may be insufficient for conveying to a user the very nature of the content that he/she is deigning to access.

BRIEF SUMMARY

In summary, one aspect of the invention provides a method comprising: connecting a display with a voice application; displaying an image on the display, the image comprising a main portion and at least one subsidiary portion, the main portion representing a contextual entity of the audio content and the at least one subsidiary portion representing at least one participatory entity of the audio content; said displaying comprising displaying the at least one subsidiary portion without text; and changing the image responsive to changes in audio content in the voice application.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIGS. 1-8. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 10. In accordance with an example embodiment, most if not all of the process steps, components and outputs discussed with respect to FIGS. 1-8 can be performed or utilized by way of a processing unit or units and system memory such as those indicated, respectively, at 16' and 28' in FIG. 10 whether on a server computer, a client computer, a node computer in a distributed network, or any combination thereof.

Figure 1:
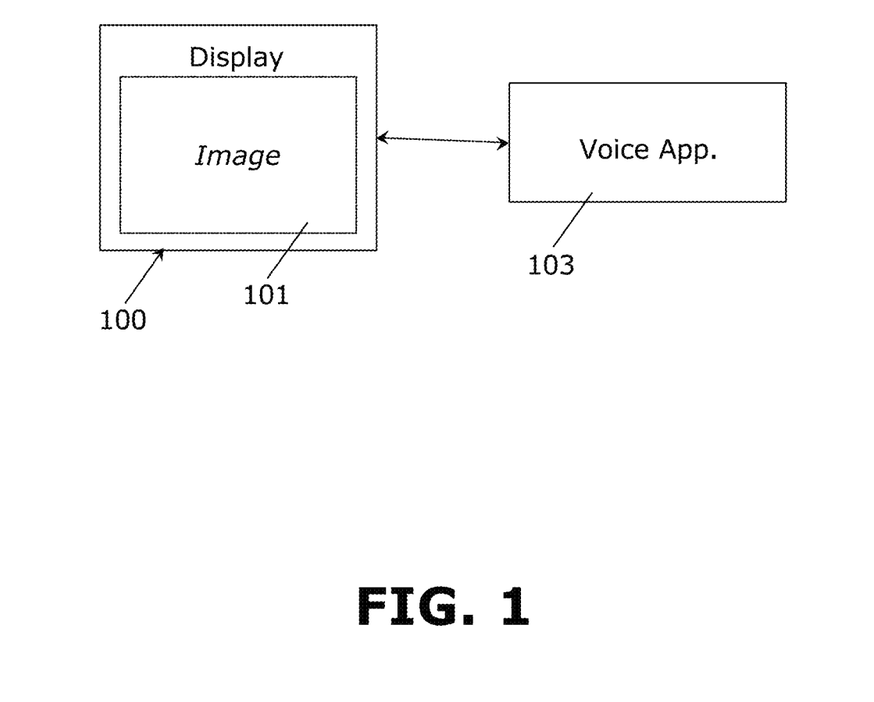
FIG. 1 schematically illustrates an arrangement for conveying an image on a display with regard to representing audio content in a voice application.
Figure 6:
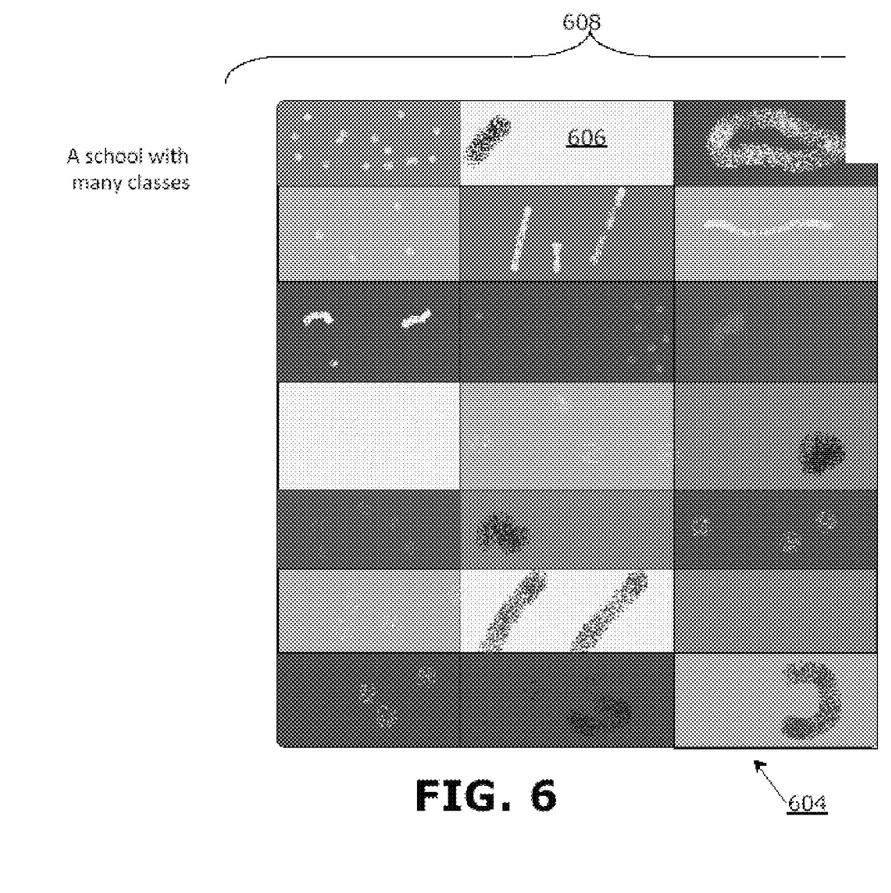
Figure 7:
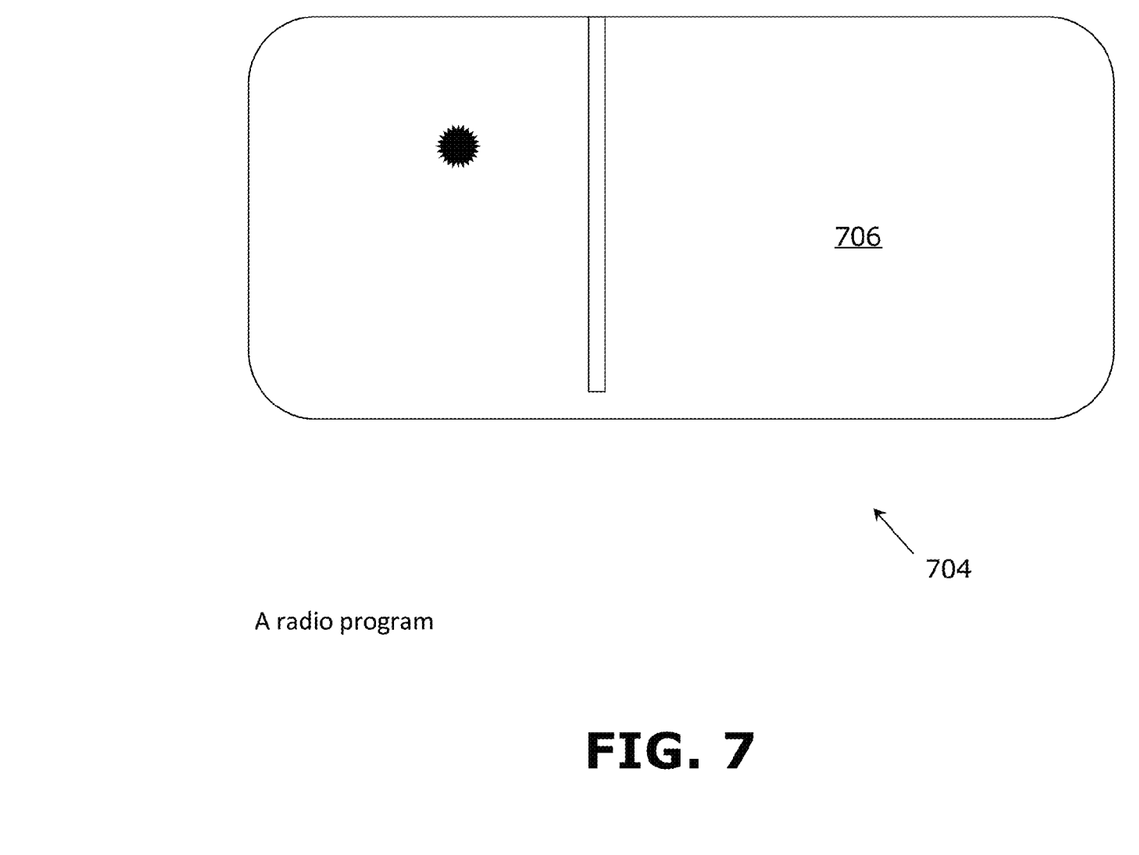
Figure 8:
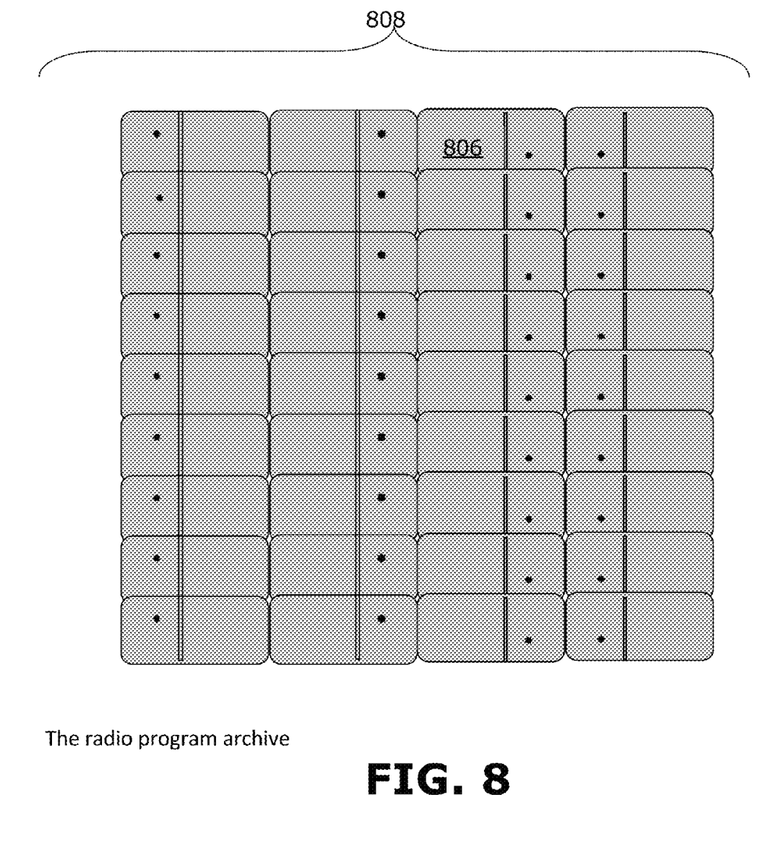

To facilitate easier reference, in advancing from FIG. 1 to and through FIG. 8, a reference numeral is advanced by a multiple of 100 in indicating a substantially similar or analogous component or element with respect to at least one component or element found in at least one earlier figure among FIGS. 1-8.

Generally, the creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a program creator may create a VoiceSite or modify an existing VoiceSite using a cellular phone. The Spoken Web is an ideal solution for a large part of the world where the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

Generally, the World Wide Telecom Web and interconnected voice applications (VoiceSites) and can be accessed by any voice-capable (e.g., landline or cellular) telephone. In the course of an ordinary phone call, the user interacts with a service or other application through speech or DTMF (dual tone multi frequency, or the signal to the phone company that is generated when one presses the touch keys of a telephone, which can also be referred to as "touch tone" or "telephone touch tone").

By way of further background in accordance with at least one embodiment of the invention, SWAF (Spoken Web Application Framework) can be used in creating VoiceSites. Background information on SWAF may be found in A. Kumar et al., "The Spoken Web Application Framework User Generated Content and Service Creation through low-end mobiles" in 7th International Cross-Disciplinary Conference on Web Accessibility (W4A; collocated with World Wide Web Conference, 2010).

In accordance with at least one embodiment of the invention, in a voice application with a capability for user generated audio content (such as VoiceSites), there are broadly contemplated herein methods and arrangements for visually representing audio content in a voice application via employing visual cues comprising at least two identifying components. the at least two components comprising a main component and at least one subsidiary component.

Figure 10:
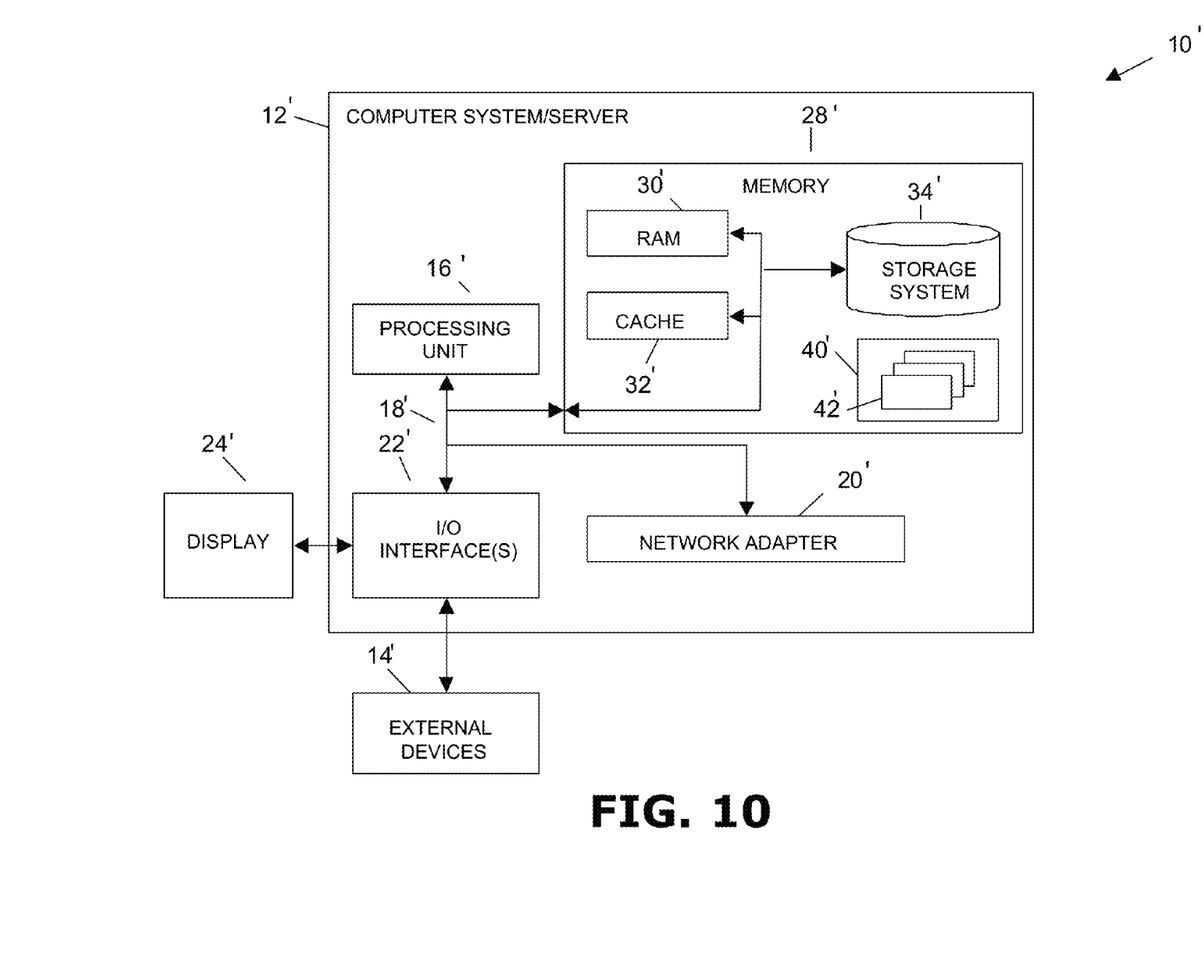
FIG. 10 illustrates a computer system.

As shown in FIG. 1, a display 100 (which may correspond to a display such as that indicated at 24' in FIG. 10) is configured to display an image 101. The display 100 is in communication with a voice application 103 (such as VoiceSites) and is further configured such that image 101, via conveying a main component and at least one subsidiary component, provides visual cues related to the content being navigated by a user in the voice application 103. Accordingly, inasmuch as a user may be interacting with a voice application 103 via a telephone or other auditory interface, a display 100 (corresponding to a computer display or other display) conveys an image 101 that assists the user in understanding and appreciating the content. The main component and at least one subsidiary component conveyed in the image 101 on display 100 can be in non-text form, which can be of great assistance to users who possess low literacy or otherwise may have difficulty with reading (e.g., due to impaired vision).

FIGS. 2-8 depict various images for conveying visual cues to a user by way of visually representing audio content in a voice application.

Figure 2:
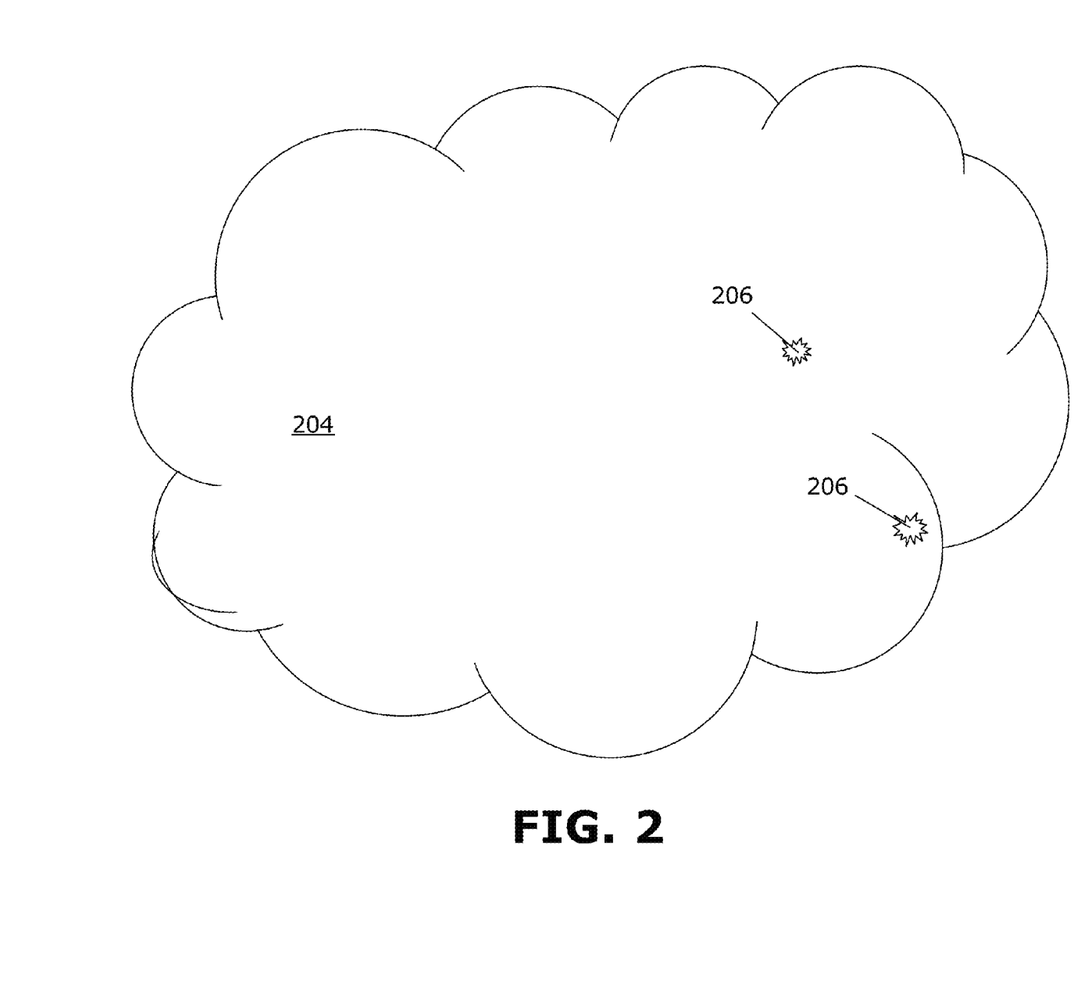
FIGS. 2-8 depict various images for conveying visual cues to a user by way of visually representing audio content in a voice application.

In accordance with at least one embodiment of the invention, the image in FIG. 2 represents a lecture in which two comments are expressed. The main component of the image, 204, represents the lecture at large while subsidiary components in the form of two small starbursts 206 represent the expressed comments.

Figure 3:
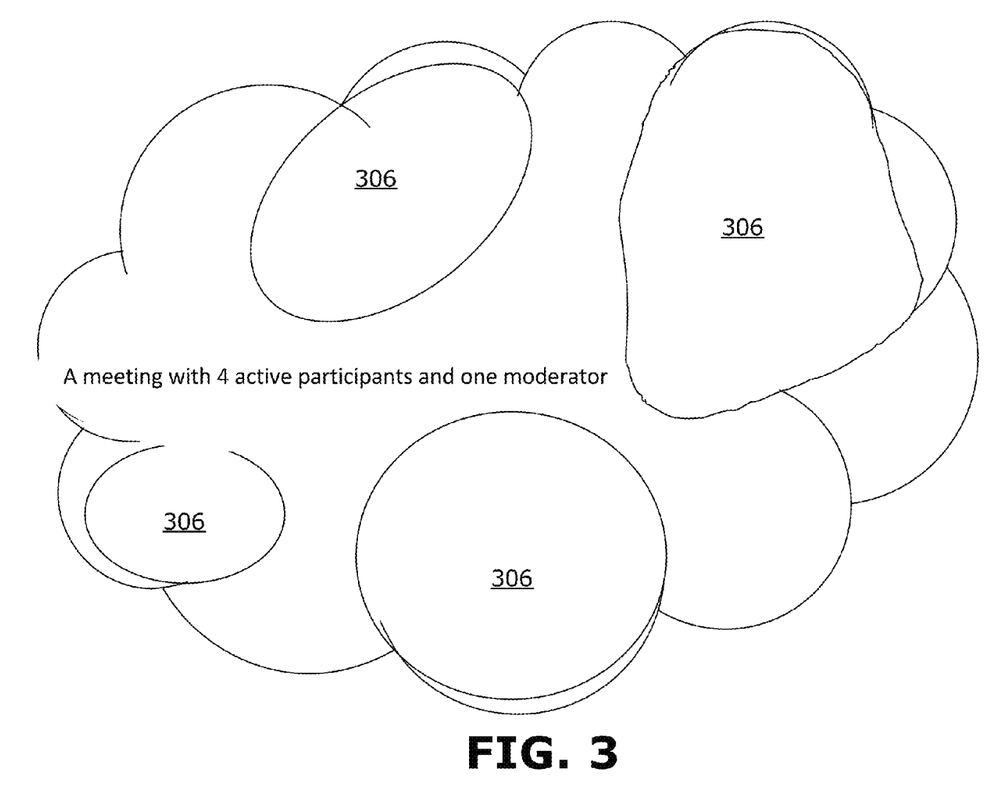

In accordance with at least one embodiment of the invention, the image in FIG. 3 represents a meeting with four participants and one moderator. The main component of the image, 304, represents the moderator (who in this case can be thought of as part of a backdrop, framework or context for other participants) while subsidiary components in the form of four smaller elliptical regions 306 represent the four participants.

Figure 4:
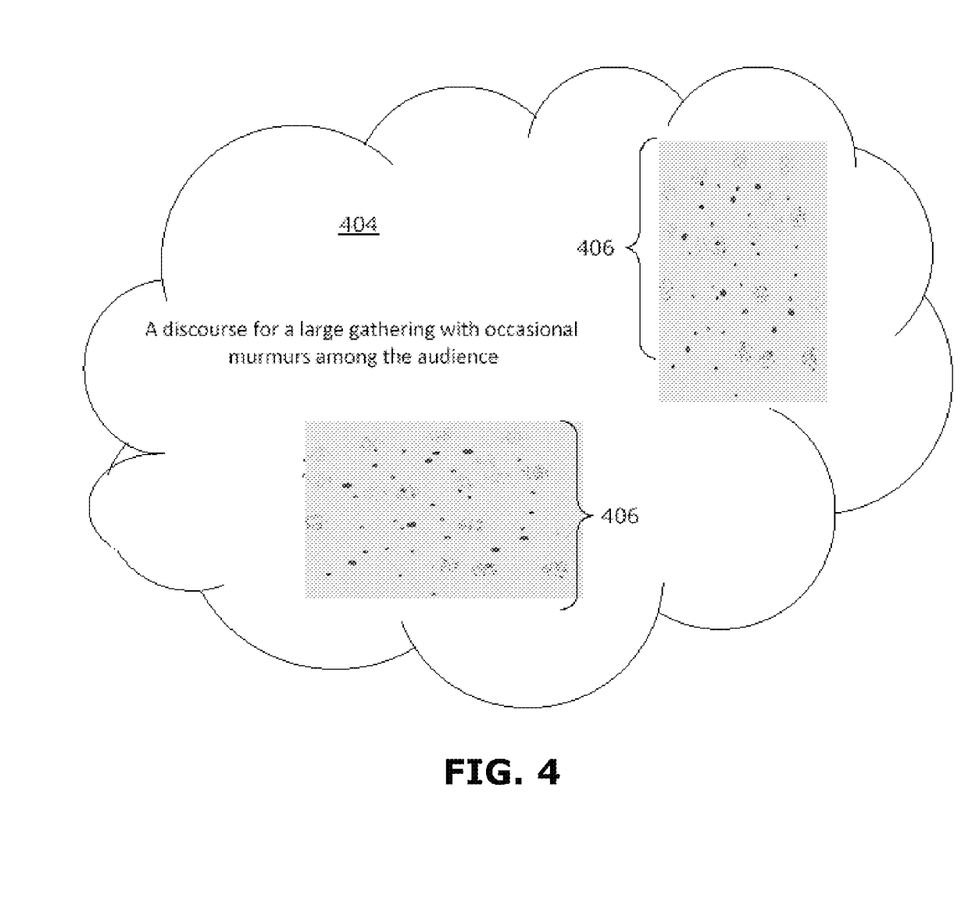

In accordance with at least one embodiment of the invention, the image in FIG. 4 represents a discourse for a large gathering with occasional murmurs from among the audience. The main component of the image, 404, represents the general gathering while subsidiary components in the form of colored or shaded splotches 406 of a diffuse "spray painted" texture represent the murmurs.

Figure 5:
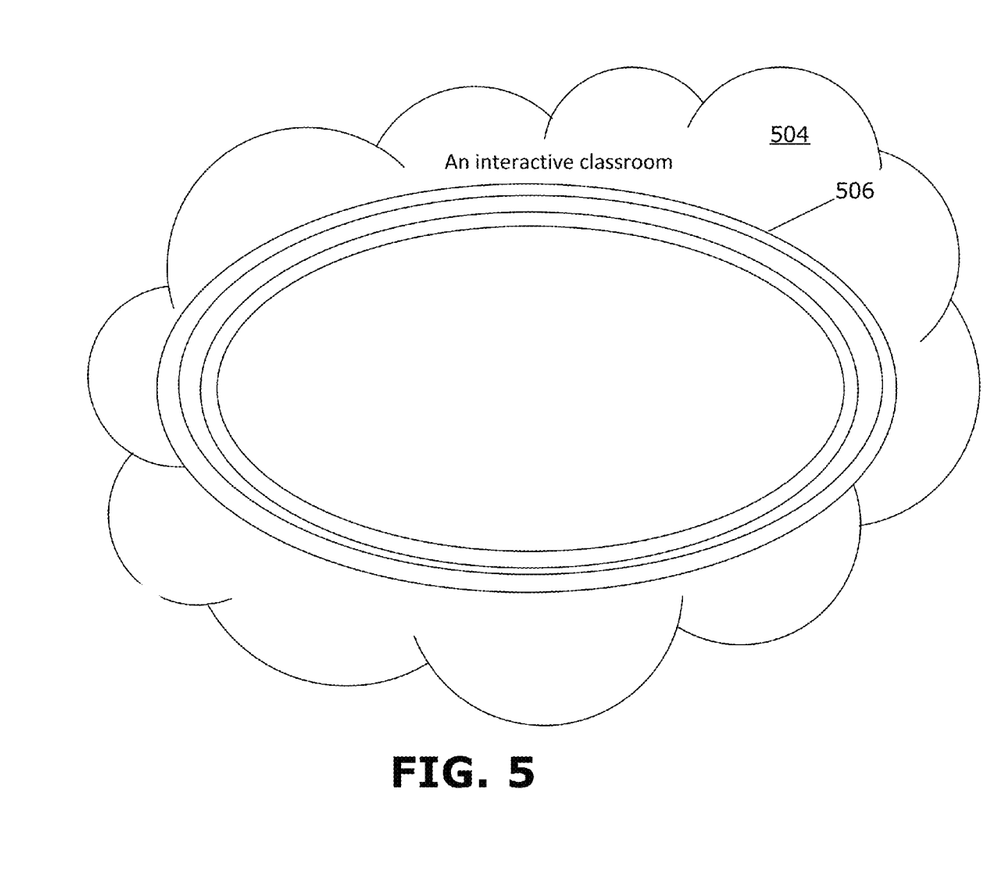

In accordance with at least one embodiment of the invention, the image in FIG. 5 represents an interactive classroom. The main component of the image, 504, represents the classroom venue at large while a subsidiary component in the form of an ellipse 506 with a rainbow (or multi-colored, multi-shaded) border, or a border comprising non-colored or non-shaded nested ellipses, represents an integrated body comprising at least one instructor and the assembled students.

In accordance with at least one embodiment of the invention, the image in FIG. 6 represents a school with many classes. The main component of the image, 604, represents the school at large while subsidiary components in the form of an array 608 (in this case, three by seven) of boxes 606 (only one of which is labeled for simplicity of reference) represent individual classes. As shown, boxes 606 in the array 608 are of differing colors (or shades) and patterns (both regular and irregular patterns) to represent the different classes.

In accordance with at least one embodiment of the invention, the image in FIG. 7 represents a radio program (e.g., on Avaaj Otlo, which is a Gujarati-language VoiceSite that offers agricultural information to farmers). The main component of the image, 704, is a general background representing a general auditory communication sphere while a subsidiary component in the form of a stylized image 706, metallic in appearance and reminiscent of a radio, represents the radio program.

In accordance with at least one embodiment of the invention, the image in FIG. 8 represents a radio program archive (e.g., on Avaaj Otlo). The main component of the image, 804, is a general background representing an auditory communication sphere while subsidiary components, in the form of an array 808 (in this case, four by nine) of stylized images 806 similar to that indicated at 706 in FIG. 7 (only one of which is labeled for simplicity of reference), represent individual archived radio programs.

The images conveyed in FIGS. 1-8, in accordance with at least one embodiment of the invention, are provided merely by way of illustrative and non-restrictive examples. As shown, at least two visual components comprising a main component and at least one subsidiary component can be provided by way of conveying visual cues to a user regarding audio content of a voice application. Patterns and colors (or shades) can be chosen in a manner to provide a suitable visual representation of the content at hand. Accordingly, a very large number of variant implementations are possible beyond those illustrated and described with respect to FIGS. 1-8. Continued reference may now be made simultaneously to all of FIGS. 1-8.

In accordance with at least one embodiment of the invention, a user may additionally interact with an image such as one of those shown in FIGS. 1-8, by way of providing commands or feedback. Such commands can include, among others: fast-forwarding through audio content; a "slow" command; a command to jump to different portions of the audio content; commands for editing and administering content at a voice application site (such as a VoiceSite); commands for viewing and editing movie or video content. For these purposes, essentially any suitable computer can be employed. An interface for performing these functions can primarily be employed by administrators who are technically capable of interacting with such representations. For instance, a suitable conventional image editor interface can be employed, e.g., something that supports actions such as cut, paste, copy, zoom in, zoom out, etc. Accordingly, toolbars or pull-down menus, as may typically be employed in image editing software, can be used. Alternatives are also conceivable, such as commands that are executable via a mechanism inherent in the images ([e.g., tap on the image once for one command, twice for another]).

In accordance with at least one embodiment of the invention, it can be appreciated that images are created which provide a visual synopsis of audio content, to thus impart an intuitive summary of the content. Various aspects of audio content can correspond to different parameters in a visual representation and can be represented dynamically. For instance, different voices can be represented by different colors (or shades), noise or murmuring can be represented by textured patterns (e.g., as indicated at 406 in FIG. 4), and a duration of audio content can be proportional to an area of a portion of an image. Interleaving (e.g., crosstalk between participants) can be depicted either by merging colors or having them juxtaposed. Any and all visual depictions of audio content may be represented two-dimensionally or (with respect to a two-dimensional display) three-dimensionally.

In accordance with at least one embodiment of the invention, a legend can be accommodated on a display in order to explain different aspects of reading an image, e.g., which colors, shades or textures correspond to which aspect of the image (e.g., setting, conversation participants, etc.).

In accordance with at least one embodiment of the invention, it should be understood that a "main portion" and a "subsidiary portion," as referred to variously herein, can embody essentially any aspects of an image where such monikers might be suitable or appropriate. Thus, by way of a non-restrictive example, while a "main portion" may include a meeting or gathering and a "subsidiary portion" may include a speaker within the meeting or gathering, other types of interpretations are possible. Thus, by way of another non-restrictive example, if there is just one person talking outside the scope of a gathering of two or more people, the person can be regarded as the "subsidiary portion" while a more abstract concept of an "open" or non-structured forum can be considered as the "main portion", or a background or context, even a conceptual one, against which the person is speaking. In other words, even a "null" background or context can be considered to be a "main portion", or something against which a "subsidiary portion" such as a single speaker can be contrasted and from which he or she can visually and conceptually stand out.

Figure 9:
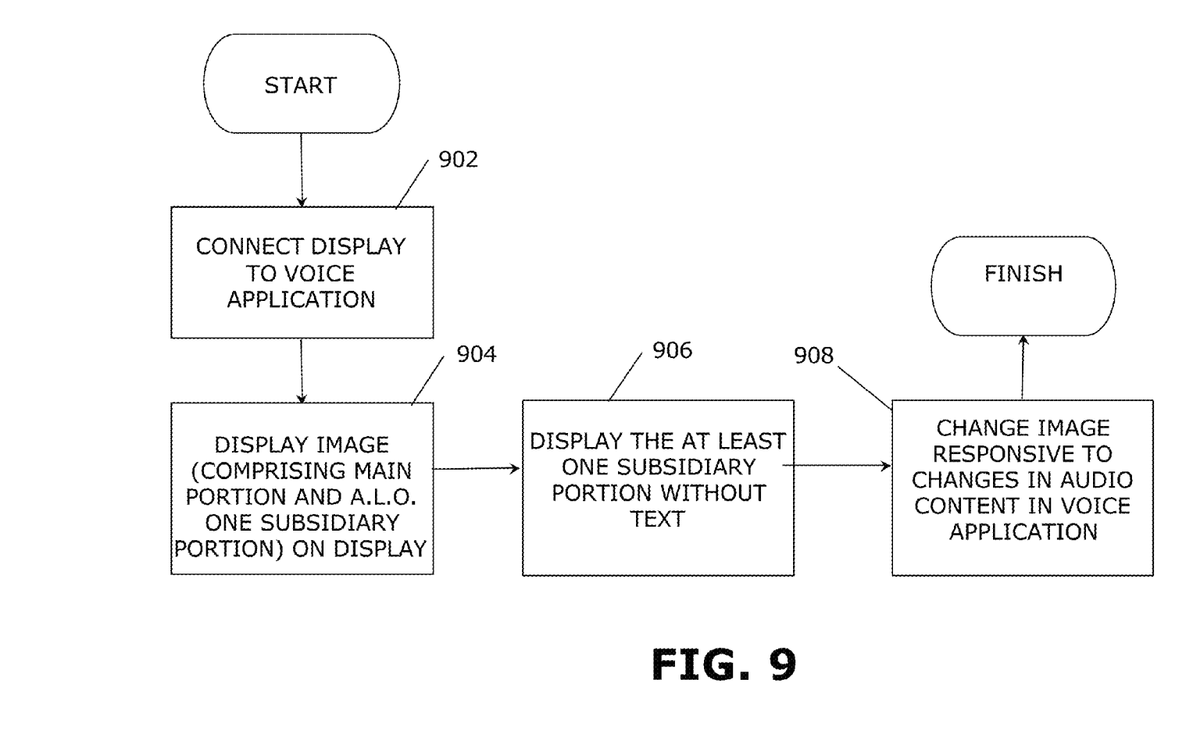
FIG. 9 sets forth a process more generally for visually representing audio content in a voice application.

FIG. 9 sets forth a process more generally for visually representing audio content in a voice application, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 10. In accordance with an example embodiment, most if not all of the process steps discussed with respect to FIG. 9 can be performed by way a processing unit or units and system memory such as those indicated, respectively, at 16' and 28' in FIG. 10.

As shown in FIG. 9, a display is connected to a voice application (902), and an image is displayed on the display (904), the image comprising a main portion and at least one subsidiary portion, the main portion representing a contextual entity of the audio content and the at least one subsidiary portion representing at least one participatory entity of the audio content. The at least one subsidiary portion is displayed without text (906), and the image is changed responsive to changes in audio content in the voice application (908).

Referring now to FIG. 10 a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    connecting a display with a voice application which provides audio content, the voice application comprising a telecom voice application with at least one voice site;
    displaying an image on the display, the image providing a visual synopsis of the audio content to impart an intuitive summary of the audio content, the image comprising a main portion and at least one subsidiary portion, the main portion representing a contextual entity of the audio content and the at least one subsidiary portion representing at least one participatory entity of the audio content;
    said displaying comprising displaying the at least one subsidiary portion without text;
    changing the image responsive to changes in audio content in the voice application; and
    computer readable program code configured to accept user input to change user navigation of the audio content, the user input comprising user manipulation of the image.

2. The method according to claim 1, wherein said changing comprises changing the at least one subsidiary portion of the image responsive to a change in the at least one participatory entity.

3. The method according to claim 1, wherein said changing comprises changing at least one parameter of at least one portion of the image, the at least one parameter comprising perceptual texture of at least one portion of the image.

4. The method according to claim 1, wherein said changing comprises changing the image responsive to at least one change in the audio content, the at least one change in audio content comprising at least one taken from the group consisting of: a change in at least one voice in the audio content; a change in noise in the audio content; a change in murmuring in the audio content; a change in duration in the audio content.

5. The method according to claim 1, wherein said displaying comprises associating the image with at least one taken from the group consisting of: an audio file, an audio/visual file.

6. The method according to claim 1, wherein the image comprises a three-dimensional representation.

7. The method according to claim 1, wherein said changing comprises changing the image responsive to at least one taken from the group consisting of: audio interleaving, audio content duration, an interaction involving the at least one participatory entity.

8. The method according to claim 1, further comprising affording a feedback capability to alter the image.

9. The method according to claim 1, further comprising affording a searching capability for searching in the audio content.

* * * * *